United States Patent
Koehler et al.

(10) Patent No.: US 9,828,988 B2
(45) Date of Patent: Nov. 28, 2017

(54) DAMPER FOR A HIGH-PRESSURE PUMP

(71) Applicant: Continental Automotive GmbH, Hannover (DE)

(72) Inventors: Mario Koehler, Bannewitz (DE); Michael Mauer, Regensburg (DE); Peter Voigt, Bettange-sur-Mess (LU); Eugenia Herdt, Regensburg (DE); Uwe Kasper, Meinerzhagen (DE); Stefan Kulzer, Beucherling (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 0 days.

(21) Appl. No.: 14/763,236

(22) PCT Filed: Sep. 25, 2014

(86) PCT No.: PCT/EP2014/070469
§ 371 (c)(1),
(2) Date: Jul. 24, 2015

(87) PCT Pub. No.: WO2015/044258
PCT Pub. Date: Apr. 2, 2015

(65) Prior Publication Data
US 2016/0195084 A1    Jul. 7, 2016

(30) Foreign Application Priority Data
Sep. 26, 2013    (DE) .................. 10 2013 219 428

(51) Int. Cl.
*F16L 55/04*    (2006.01)
*F04B 53/00*    (2006.01)
(Continued)

(52) U.S. Cl.
CPC .......... *F04B 53/001* (2013.01); *F02M 55/04* (2013.01); *F02M 59/44* (2013.01);
(Continued)

(58) Field of Classification Search
CPC ...... F16L 55/04; F16L 55/0338; F04B 53/004
(Continued)

(56) References Cited

U.S. PATENT DOCUMENTS

| 4,729,360 A | 3/1988 | Fehrenbach et al. ......... 123/447 |
| 6,866,489 B2 | 3/2005 | Hinz et al. .................... 417/470 |

(Continued)

FOREIGN PATENT DOCUMENTS

| DE | 102004002489 A1 | 8/2005 | ............. F02M 55/04 |
| DE | 102011090186 A1 | 7/2013 | ............. F02M 55/04 |

(Continued)

OTHER PUBLICATIONS

German Office Action, Application No. 102013219428.5, 7 pages, May 30, 2014.
(Continued)

*Primary Examiner* — Patrick F Brinson
(74) *Attorney, Agent, or Firm* — Slayden Grubert Beard PLLC (57) ABSTRACT

A damper for a high-pressure pump includes a housing and a cover that can be coupled to the housing to form a damping space. The cover has an elevation including a plurality of concave regions and a plurality of convex regions, wherein the concave and convex regions are arranged about a central region of the elevation. Each of the concave regions is arranged between two of the convex regions in order to scatter sound.

21 Claims, 4 Drawing Sheets

(51) Int. Cl.
  *F02M 55/04* (2006.01)
  *F02M 59/44* (2006.01)
  *F04B 11/00* (2006.01)

(52) U.S. Cl.
  CPC ...... *F04B 11/0016* (2013.01); *F02M 2200/09* (2013.01); *F16L 55/04* (2013.01)

(58) Field of Classification Search
  USPC ............. 138/26, 30; 417/540, 542; 137/207; 220/720, 724
  See application file for complete search history.

(56) References Cited

U.S. PATENT DOCUMENTS

| | | | | |
|---|---|---|---|---|
| 8,366,421 | B2 * | 2/2013 | Munakata | F02M 55/04 123/510 |
| 8,757,212 | B2 * | 6/2014 | Bartsch | B60T 8/4068 138/26 |
| 9,074,593 | B2 * | 7/2015 | Kobayashi | F04B 11/0008 |
| 2002/0153209 | A1 * | 10/2002 | Nagy | B60T 8/4068 188/73.37 |
| 2002/0157906 | A1 * | 10/2002 | Nagy | B60T 8/4068 188/73.37 |
| 2008/0289713 | A1 * | 11/2008 | Munakata | F02M 55/04 138/26 |
| 2009/0185922 | A1 * | 7/2009 | Inoue | F02M 55/04 417/540 |
| 2013/0008544 | A1 * | 1/2013 | Briesewitz | B60T 8/4068 138/30 |
| 2013/0230417 | A1 * | 9/2013 | Kobayashi | F04B 11/0008 417/395 |
| 2014/0193280 | A1 | 7/2014 | Saito | 417/540 |

FOREIGN PATENT DOCUMENTS

| | | | |
|---|---|---|---|
| DE | 102013203507 A1 | 9/2013 | ............ F02M 55/04 |
| EP | 1995446 A2 | 11/2008 | ............ F02M 55/04 |
| JP | 57200788 A | 12/1982 | ............ F02M 37/00 |
| JP | 4182598 A | 6/1992 | ............ E21D 11/38 |
| JP | 9302717 A | 11/1997 | ................ E02F 9/00 |
| JP | 10219631 A | 8/1998 | ................ E02F 8/00 |
| JP | 2002106438 A | 4/2002 | ............ F02M 37/00 |
| JP | 2004138071 A | 5/2004 | ............ F02M 37/00 |
| JP | 2008019728 A | 1/2008 | ............ F02M 55/00 |
| JP | EP 1995446 A2 * | 11/2008 | ............ F02M 55/04 |
| JP | 2010270727 A | 12/2010 | ............ F02M 55/00 |
| JP | 2011117429 A | 6/2011 | ............ F02M 59/02 |
| JP | 2011144700 A * | 7/2011 | |
| JP | 2012117471 A | 6/2012 | ............ F02M 55/00 |
| JP | 2012154304 A | 8/2012 | ............ F02M 55/00 |
| JP | 2013064364 A | 4/2013 | ............ F02M 55/00 |
| WO | 01/70550 A2 | 9/2001 | ............ B60T 17/00 |
| WO | 2015/044258 A1 | 4/2015 | ............ F02M 55/04 |

OTHER PUBLICATIONS

International Search Report and Written Opinion, Application No. PCT/EP2014/070469, 13 pages, Dec. 5, 2014.
Chinese Office Action, Application No. 201480011254.1, 6 pages, Dec. 30, 2016.

* cited by examiner

FIG 7

DAMPER FOR A HIGH-PRESSURE PUMP

CROSS-REFERENCE TO RELATED APPLICATIONS

This application is a U.S. National Stage Application of International Application No. PCT/EP2014/070469 filed Sep. 25, 2014, which designates the United States of America, and claims priority to DE Application No. 10 2013 219 428.5 filed Sep. 26, 2013, the contents of which are hereby incorporated by reference in their entirety.

TECHNICAL FIELD

The invention relates to a damper for a high-pressure pump, in particular for a high-pressure pump for a fuel injection system for an internal combustion engine.

BACKGROUND

High-pressure pumps, in particular a high-pressure pump for a fuel injection system of a motor vehicle, conventionally have a damper on the low-pressure side. The damper is designed to dampen pressure pulsations at the low-pressure side. For example, the damper is coupled, for hydraulic communication, to a predelivery pump and/or to a fluid tank.

Owing to mechanical and hydraulic processes within the high-pressure pump, pressure pulsations are generated. The pressure pulsations are for example emitted via thin-walled components, as body-borne sound, to the surroundings.

In the case of a conventional damper, in order to reduce the sound emissions, a cross-shaped stiffening means is for example provided on the cover.

SUMMARY

One embodiment provides a damper for a high-pressure pump, having: a housing, and a cover which can be coupled to the housing in order to form a damping chamber, wherein the cover has an elevation and, on the elevation, there are formed a multiplicity of concave regions and a multiplicity of convex regions, wherein the concave and convex regions are arranged around a central region of the elevation, and in each case one of the concave regions is arranged between two of the convex regions, for the purpose of scattering sound.

In a further embodiment, the central region is of convex or concave or planar form.

In a further embodiment, the cover has a central point, wherein the central region is arranged offset with respect to the central point.

In a further embodiment, the central region has a non-circular shape.

In a further embodiment, the concave and the convex regions are arranged so as to be distributed uniformly about the central region.

In a further embodiment, the concave and the convex regions are arranged so as to be distributed non-uniformly about the central region.

In a further embodiment, the multiplicity of concave regions comprises at least three concave regions and the multiplicity of convex regions comprises at least three convex regions.

In a further embodiment, the regions of the multiplicity of concave regions and the regions of the multiplicity of convex regions each span a circular sector of equal size.

In a further embodiment, the regions of the multiplicity of concave regions and the regions of the multiplicity of convex regions each span circular sectors of mutually different size.

In a further embodiment, the concave regions span circular sectors of mutually different size, and/or wherein the convex regions span circular sectors of mutually different size.

In a further embodiment, the cover includes, in the radial direction proceeding from the central region: a first elevation region which has a multiplicity of convex regions and a multiplicity of concave regions which are arranged around the central region, wherein in each case one of the concave regions is arranged between two of the convex regions, and a second elevation region which has a multiplicity of convex regions or concave regions which are arranged spaced apart from one another around the central region.

In a further embodiment, the cover is produced by a cutting process.

In a further embodiment, the cover is produced by a non-cutting process.

In a further embodiment, the cover has an annular edge region which is arranged in a first plane, and the elevation projects beyond the edge region as far as a second plane, wherein the second plane is spaced apart from the first plane such that, between the central region and the edge region, there is formed an annular sloping region, and the multiplicity of convex regions and the multiplicity of concave regions are arranged on the sloping region.

In a further embodiment, the central region extends as far as a third plane which is spaced apart from the first plane and the second plane.

BRIEF DESCRIPTION OF THE DRAWINGS

Examples embodiment are discussed below with reference to the drawings, in which.

DETAILED DESCRIPTION

Embodiments of the invention provide a damper for a high-pressure pump, which damper makes it possible to realize low noise emissions.

Some embodiments provide a damper for a high-pressure pump having a damper housing. The damper has a cover which can be coupled to the housing in order to form a damping chamber. The cover has an elevation. On the elevation, there are formed a multiplicity of concave regions and a multiplicity of convex regions. The concave and convex regions are each arranged around a central region of the elevation. In each case one of the concave regions is arranged between two of the convex regions. The concave and convex regions are arranged around the central region in order to scatter sound.

Based on the elevation having alternating concave and convex regions, the cover of the damper is rigid and durable. The rigidity has the effect that the sound emissions from the damper or from the high-pressure pump are reduced. Thus, adequately low noise emission levels are realized. For example, a maximum admissible noise emission level for the high-pressure pump is predefined. Through the arrangement of alternating concave and convex regions on the elevation of the cover, the predefined noise emission level is not exceeded. For example, the concave and convex regions are arranged annularly on the elevation. In further embodiments, some other form of arrangement is possible, for example oval or rectangular.

In further embodiments, the central region is of convex or concave or planar form. By means of a convex or concave form for the central region, particularly low noise emissions can be attained. A planar central region can for example be easily labeled with a name or logo.

In further embodiments, the cover has a central point, wherein the central region is arranged offset with respect to the central point.

In further embodiments, the central region has a non-circular shape. For example, the central region may be of polygonal, in particular triangular form.

In further embodiments, the concave and the convex regions are arranged uniformly. In particular, the regions each span a circular sector of equal size. It is also possible for the convex and concave regions to be arranged non-uniformly.

In further embodiments, the multiplicity of concave regions comprises at least three concave regions. The multiplicity of convex regions comprises for example at least three convex regions. For example, seven concave regions and seven convex regions are arranged annularly around the central region. This permits a good reduction of noise emissions.

In further embodiments, the concave regions and convex regions each span circular sectors of different size. The concave and convex regions are of different widths. In particular, the number and shape of the concave and convex regions are predefined in a manner dependent on a maximum admissible noise emission level.

In further embodiments, the concave regions span circular sectors of mutually different size. This means that the concave regions are designed to be of different sizes.

Alternatively or in addition, the convex regions also span circular sectors of mutually different size, and are thus designed to be of different sizes.

In further embodiments, the cover has, in the radial direction proceeding from the central region, a first elevation region which has a multiplicity of convex regions and a multiplicity of concave regions which are arranged around the central region, wherein in each case one of the concave regions is arranged between two of the convex regions. Furthermore, the cover has, in the radial direction proceeding from the central region, a second elevation region which has a multiplicity of convex regions or concave regions which are arranged spaced apart from one another around the central region. In this way, as viewed in the radial direction from the central region, the convex and concave regions are arranged offset with respect to one another.

In further embodiments, the cover is produced by a cutting process. The cover can be produced easily in this way.

In further embodiments, the cover is produced by a non-cutting process. The cover is produced for example by a deformation process. The cover can be produced efficiently in this way.

In further embodiments, the cover has an annular edge region. The annular edge region is arranged in a first plane. The elevation projects beyond the edge region as far as a second plane. The second plane is spaced apart from the first plane, such that an annular sloping region is formed between the central region and the edge region. The multiplicity of convex regions and the multiplicity of concave regions are each arranged on the sloping region. If the central region is of convex or concave form, the central region extends as far as a third plane which is spaced apart in each case from the first plane and from the second plane.

Figure 1:
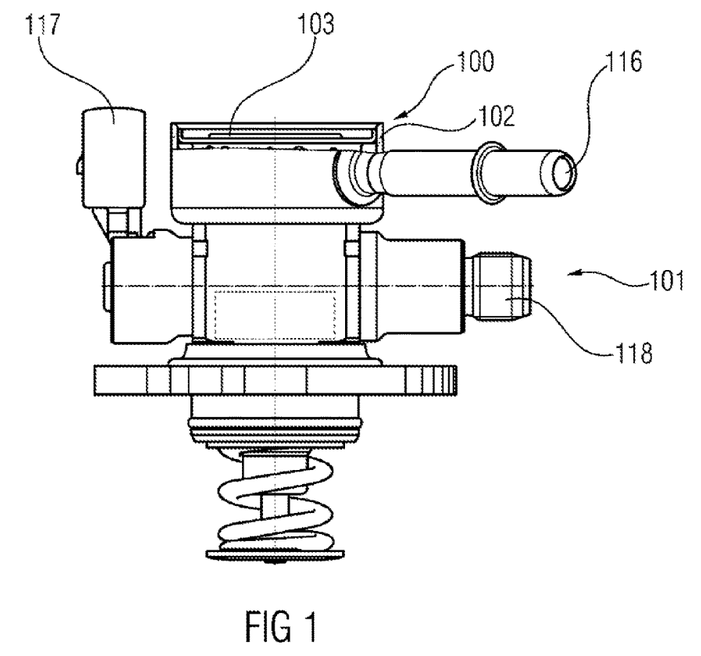
FIG. 1 is a schematic illustration of a high-pressure pump according to example embodiments.

FIG. 1 is a schematic illustration of a high-pressure pump 101, according to an example embodiment. The high-pressure pump 101 is in particular part of a fuel injection system of an internal combustion engine of a motor vehicle. The high-pressure pump 101 is designed to draw fluid out of a low-pressure region and, imparting a pressure to said fluid, deliver said fluid into a high-pressure region. The fluid is in particular a fuel, for example gasoline or diesel. The high-pressure pump is designed to impart pressures of 2500 bar or higher to the fluid. In the field of high-pressure pumps for gasoline injection systems, pressures of 500 bar in the high-pressure region are provided, for example.

The high-pressure pump 101 is coupled via a damper 100 to the fluid supply. The damper is coupled to a low-pressure port 116. Via the low-pressure port 116 and the damper 100, fluid can be drawn into a pump cylinder during the suction phase of the pump 101. The low-pressure port 116 is for example coupled to further fluid lines of a supply, and is thus hydraulically connected to a fluid tank and/or to a predelivery pump. The fluid that has had pressure imparted to it passes from a high-pressure outlet 118 to a fuel accumulator line (common rail) or to injection valves.

The damper 100 is arranged on the low-pressure side, at which for example pressures of below 5 bar prevail. The damper 100 is for example a diaphragm-type damper. The damper 100 is designed to dampen pressure pulsations on the low-pressure side. Pressure pulsations arise for example if fluid is delivered back from the cylinder chamber of the high-pressure pump 101 into the low-pressure region through the low-pressure port 116 when the inlet valve 117 is open. This is the case for example in a partial-delivery situation of the high-pressure pump 101 in the case of delivery rates of below 100%. The back-flowing fluid can cause pressure pulsations. These are dampened by the damper 100.

Figure 2:
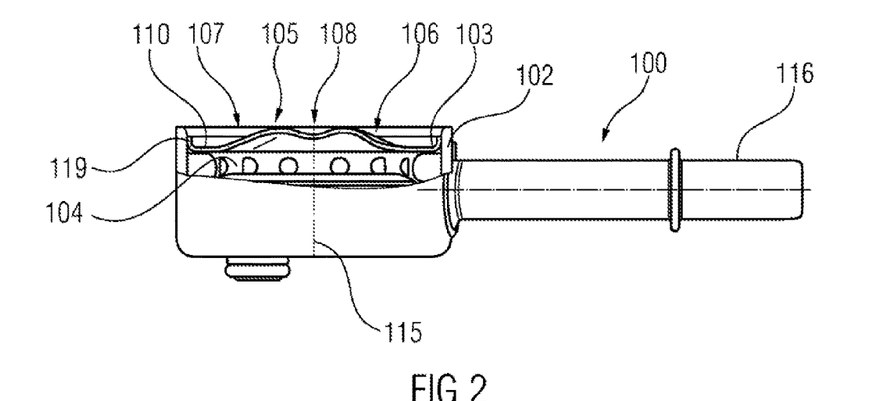
FIG. 2 is a schematic illustration of a damper according to example embodiments.

FIG. 2 shows the damper 100 according to an embodiment. The damper 100 has a housing 102 and a cover 103. The low-pressure port 116 is coupled to the housing 102. The cover 103 and the housing 102 form a damping chamber 104. The damping chamber 104 is filled with fluid during operation. In the damping chamber 104 there is provided, for example, a damping diaphragm in order to dampen pressure pulsations of the fluid.

The cover 103 and the housing 102 have a longitudinal axis 115. In particular, a central region 108 is arranged at the point of intersection of the longitudinal axis 115 with the cover 103. At the central region 108 and adjacent to the central region 108, the cover 103 has an elevation 105. The elevation 105 projects beyond an edge region 110. In the assembled state, the edge region 110 adjoins the housing 102. The edge region 110 annularly surrounds the elevation 105.

A multiplicity of concave regions 106 and a multiplicity of convex regions 107 are arranged on the elevation 105. In the orientation in FIG. 2, the concave regions 106 are arranged in recessed fashion and the convex regions 107 are arranged in projecting fashion. The concave regions 106 and the convex regions 107 are in particular arranged annularly around the central region 108 in alternating fashion. In the embodiment as per FIG. 2, the central region 108 is of concave form. In further embodiments, the central region 108 is of convex or planar form.

Figure 3A:
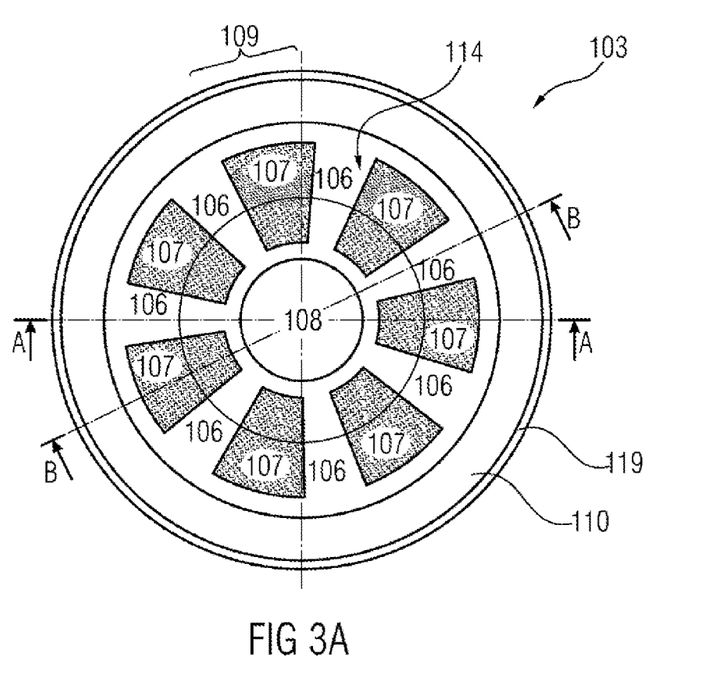
FIGS. 3A to 3C are schematic illustrations of a cover according to example embodiments.
Figure 3B:
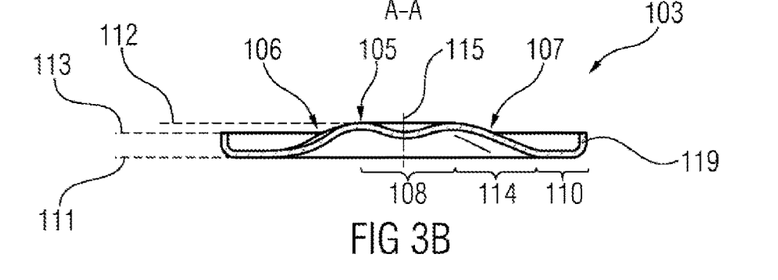
Figure 3C:
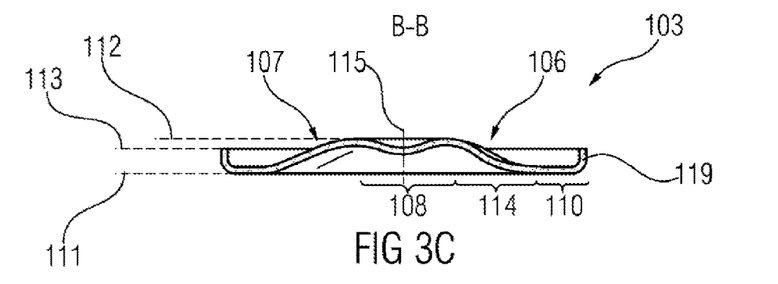

The cover 103 is illustrated in more detail in FIGS. 3A to 3C. FIG. 3A shows a plan view of the cover 103 according to embodiments. The concave regions 106 and the convex regions 107 are arranged annularly around the central region 108 in alternating fashion. In each case one concave region 106 is arranged between two convex regions 107. In each case one convex region 107 is arranged between two concave regions 106. The edge region 110 is arranged annularly around the concave regions 106 and the convex regions 107. A coupling region 119 is arranged at the outer end of the edge region 110. The coupling region 119 serves for the fastening of the cover 103 in the housing 102. For example, the cover 103 is pressed into the housing 102 by way of the coupling region 119.

In the illustrated embodiments, the concave and convex regions 106 and 107 are arranged in uniformly distributed fashion around the central region 108. In further embodiments, the concave and convex regions 106 and 107 are arranged non-uniformly around the central region 108.

The concave regions 106 and the convex regions 107 each span a circular sector 109. In the exemplary embodiments illustrated, the circular sectors 109 are each of equal size. The concave regions 106 and the convex regions 107 are each of equal width. In embodiments, the regions of the concave regions 106 and of the convex regions 107 each have mutually different widths, such that they span mutually different circular sectors 109. The shape and configuration of the concave and convex regions 106 and 107 are predefined in particular in a manner dependent on a maximum noise emission level.

In the exemplary embodiment illustrated, seven concave regions 106 and seven convex regions 107 are provided. It is also possible for more than or fewer than seven concave regions 106 and convex regions 107 to be provided. In particular, in each case more than three concave regions 106 and convex regions 107 are provided. The number of concave regions 106 and of convex regions 107 is predefined in particular in a manner dependent on a desired rigidity of the cover and a predefined maximum noise emission level for the damper 100 and for the high-pressure pump 101.

As can be seen in particular from the sectional views of FIGS. 3B and 3C along the lines AA and BB, the concave regions 106 and the convex regions 107 are arranged on a sloping region 114. The sloping region 114 extends, in sloping fashion with respect to the edge region 110, between the edge region 110 and the central region 108. The central region 108, the sloping region 114, the edge region 110 and the coupling region 109 are in particular arranged concentrically.

The edge region 110 is arranged in a first plane 111. The elevation 105 extends from the edge region 110, or the first plane 111, to a second plane 112. The second plane 112 is spaced apart from the first plane 111. The second plane 112 and the first plane 111 are in particular oriented in the same direction or in parallel, and transversely or perpendicular to the longitudinal axis 115.

In the illustrated exemplary embodiment, the concave form of the central region 108 extends as far as a third plane 113. The third plane 113 is arranged between the first plane 111 and the second plane 112. In the exemplary embodiments in which the central region 108 has a convex shape, the third plane 113 is spaced apart further than the second plane 112 from the first plane 111. Along the longitudinal axis 115, the sequence of the planes is then as follows: first plane 111, second plane 112, third plane 113.

Owing to the arrangement of the concave and convex regions 106 and 107 on the elevation 105, the noise emissions that are perceptible in particular to occupants of the motor vehicle or to passers-by in the surroundings of the motor vehicle are reduced. Furthermore, the cover is made more rigid and durable. Owing to the arrangement of the concave and convex regions 106 and 107 on the elevation 105, the body-borne sound arising from the pressure pulsations is scattered with such effectiveness that it will not exceed a predefined noise emission level. The emitted sound is scattered, and distributed in numerous directions, with such effectiveness that the noise emissions at a point relative to the damper 100 are adequately low.

In the exemplary embodiment shown, seven concave and seven convex regions 106 and 107 are arranged in alternating fashion so as to be distributed uniformly over the circumference. Thus, in the section, a convex region 107 is arranged opposite a concave region 106.

In further embodiments, the concave and convex regions 106 and 107 are distributed non-uniformly over the circumference. In the illustrated exemplary embodiments, both the concave regions 106 and the convex regions 107 have equal widths in terms of angular degrees. In further embodiments, the widths in terms of angular degrees differ from one another.

Figure 4:
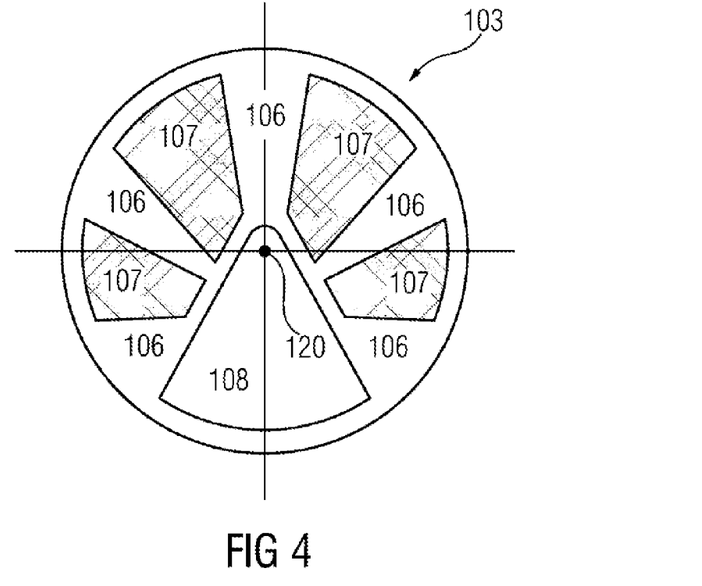
FIG. 4 shows a plan view of a cover of the damper according to a further embodiment.
Figure 5:
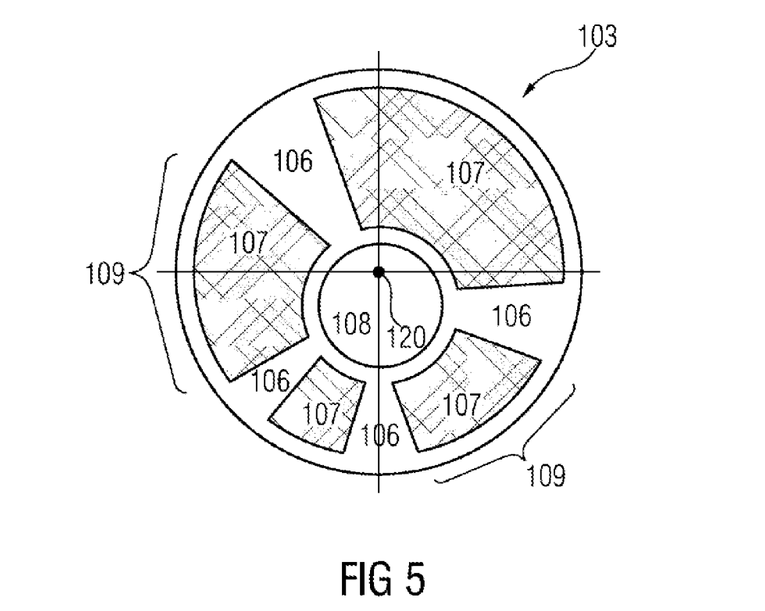
FIG. 5 shows a plan view of a cover of the damper according to a further embodiment.
Figure 6:
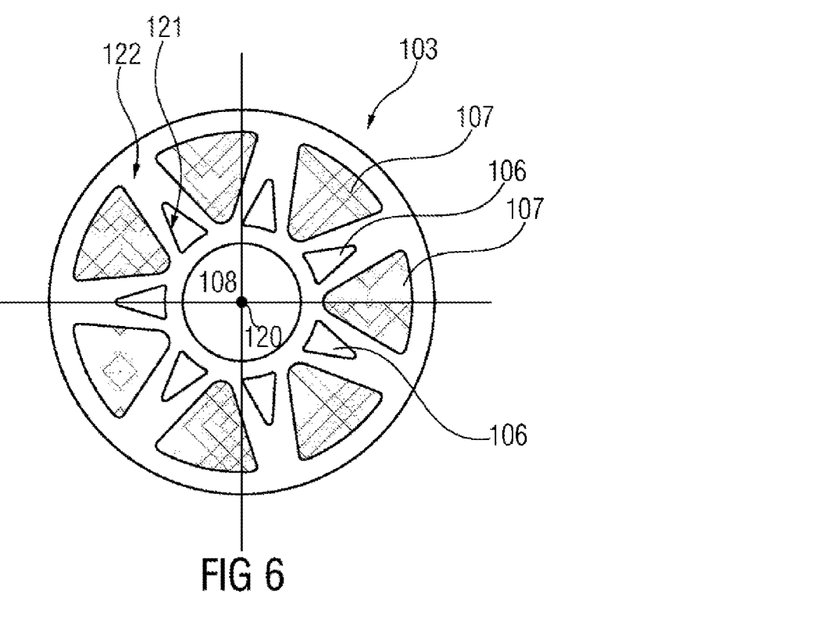
FIG. 6 shows a plan view of a cover of the damper according to a further embodiment.

FIGS. 4 to 6 show further embodiments of the cover 103.

In FIG. 4, the central region 108 is not of circular form as shown in FIG. 3a, and instead has a non-circular shape. As an example, FIG. 4 shows a triangular shape. It is however also possible for the central region to have the form of a square, rectangle or some other polygon.

FIG. 5 shows an embodiment of the cover 103 in which the convex regions 107 span circular sectors of mutually different size. This means that said convex regions are of different sizes. Instead of the convex regions 107, it is also possible for the concave regions 106 to span circular sectors of mutually different size. It is also possible to select a combination of these, such that concave regions of different size and convex regions of different size are provided.

Furthermore, in FIG. 5, the central region 108 is arranged offset with respect to a central point 120 of the cover 103, such that altogether, an asymmetrical arrangement of central region 108 and convex regions 107 and concave regions 106 is attained.

FIG. 6 shows an embodiment in which the convex regions 107 and the concave regions 106 are arranged offset with respect to one another. In this case, the cover 103 has, in the radial direction proceeding from the central region 108, two regions, specifically a first elevation region 121 and a second elevation region 122. In the first elevation region 121, there are provided both a multiplicity of convex regions 107 and a multiplicity of concave regions 106, which are arranged around the central region 108. In this case, concave regions 106 and convex regions 107 alternate with one another, that is to say in each case one of the concave regions 106 is arranged between two of the convex regions 107. In the second elevation region 122, there are provided either only convex regions 107 or only concave regions 106, which are arranged around the central region 108 and are spaced apart from one another. In the embodiment shown in FIG. 6, the first elevation region 121 is arranged closer than the second elevation region 122 to the central region 108, though it is also possible for this arrangement to be reversed.

Figure 7:
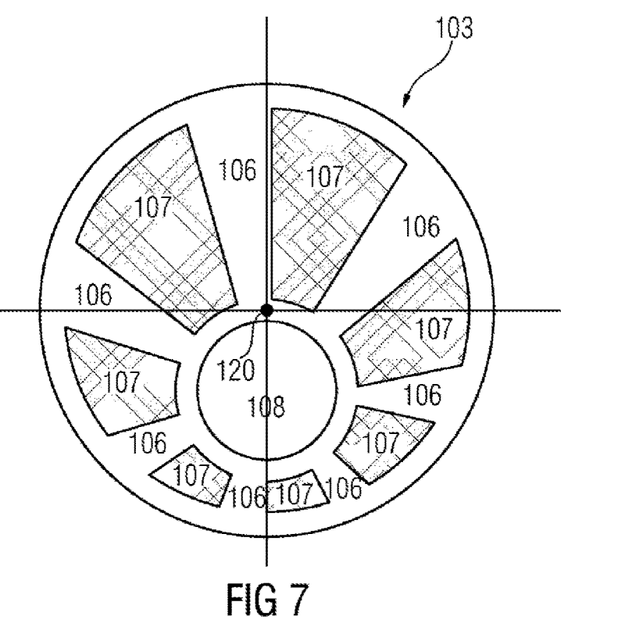
FIG. 7 shows a plan view of a cover of the damper according to a further embodiment.

FIG. 7 shows an embodiment in which the central region 108 is arranged offset with respect to the central point 120 of the cover 103. In the embodiment shown in FIG. 7, the convex regions 107 and the concave regions 106 are arranged uniformly about the central region 108. In this way, they have different lengths as viewed in the radial direction proceeding from the central region 108.

All of the geometrical arrangements illustrated in FIGS. 3a to 3c and 4 to 7 may be combined with one another if nothing opposes this from a steric aspect.

In embodiments, the cover 103 is composed of a metal. In further embodiments, the cover 103 is composed of a non-metallic material. In embodiments, the central region 108 is of planar form. For example, a name or logo is stamped onto the planar central region 108. The multiplicity of concave regions 106 may have an even number or an odd number of concave regions 106. The multiplicity of convex regions 107 may have an even number or an odd number of convex regions 107. In the illustrated embodiments, the coupling region 119 is bent upward. In further embodiments, the coupling region 119 is bent downward. Alternatively, the coupling region 119 is designed so as to terminate in flat fashion.

What is claimed is:

1. A damper for a high-pressure pump, comprising:
a housing, and
a cover configured for coupling to the housing to form a damping chamber,
wherein the cover has an elevation including a plurality of concave regions and a plurality of convex regions and a center point,
wherein the concave and convex regions are arranged in an array distributed around a central region of the elevation offset from the central point, and
wherein each concave region is arranged between two of the convex regions along a circular path around the center point to form a sound-scattering structure.

2. The damper of claim 1, wherein the central region is convex, concave, or planar.

3. The damper of claim 1, wherein the concave and the convex regions are distributed non-uniformly about the central region.

4. The damper of claim 1, wherein the plurality of concave regions comprises at least three concave regions and the plurality of convex regions comprises at least three convex regions.

5. The damper of claim 1, wherein each of the plurality of concave regions and convex regions spans a circular sector of equal size.

6. The damper of claim 1, wherein each of the plurality of concave regions spans a circular sector of a first size, and each of the plurality of convex regions spans a circular sector of a second size different than the first size.

7. The damper of claim 1, wherein at least one of:
at least two of the concave regions span circular sectors of mutually different sizes, or
at least two of the convex regions span circular sectors of mutually different sizes.

8. The damper of claim 1, wherein the cover includes, in a radial direction proceeding from the central region:
a first elevation region having a plurality of convex regions and a plurality of concave regions arranged around the central region, wherein each concave region is arranged between two of the convex regions, and
a second elevation region having a plurality of convex regions or concave regions arranged spaced apart from one another around the central region.

9. The damper of claim 1, wherein:
the cover has an annular edge region arranged in a first plane, and
the elevation projects beyond the edge region as far as a second plane,
wherein the second plane is spaced apart from the first plane such that an annular sloping region is located between the central region and the edge region, and the plurality of convex regions and the plurality of concave regions are arranged on the sloping region.

10. The damper of claim 9, wherein the central region extends as far as a third plane that is spaced apart from the first plane and the second plane.

11. A damper for a high-pressure pump, comprising:
a housing, and
a cover configured for coupling to the housing to form a damping chamber,
wherein the cover has an elevation including a plurality of concave regions and a plurality of convex regions and a center point,
wherein the concave and convex regions are arranged in an array distributed around a central region of the elevation, the central region having a non-circular shape, and
wherein each concave region is arranged between two of the convex regions along a circular path around the center point to form a sound-scattering structure.

12. The damper of claim 11, wherein the central region is convex, concave, or planar.

13. The damper of claim 11, wherein the concave and the convex regions are distributed uniformly about the central region.

14. The damper of claim 11, wherein the concave and the convex regions are distributed non-uniformly about the central region.

15. The damper of claim 11, wherein the plurality of concave regions comprises at least three concave regions and the plurality of convex regions comprises at least three convex regions.

16. The damper of claim 11, wherein each of the plurality of concave regions and convex regions spans a circular sector of equal size.

17. The damper of claim 11, wherein each of the plurality of concave regions spans a circular sector of a first size, and each of the plurality of convex regions spans a circular sector of a second size different than the first size.

18. The damper of claim 11, wherein at least one of:
at least two of the concave regions span circular sectors of mutually different sizes, or
at least two of the convex regions span circular sectors of mutually different sizes.

19. The damper of claim 11, wherein the cover includes, in a radial direction proceeding from the central region:
a first elevation region having a plurality of convex regions and a plurality of concave regions arranged around the central region, wherein each concave region is arranged between two of the convex regions, and
a second elevation region having a plurality of convex regions or concave regions arranged spaced apart from one another around the central region.

20. The damper of claim 11, wherein:
the cover has an annular edge region arranged in a first plane, and
the elevation projects beyond the edge region as far as a second plane,
wherein the second plane is spaced apart from the first plane such that an annular sloping region is located between the central region and the edge region, and the plurality of convex regions and the plurality of concave regions are arranged on the sloping region.

21. The damper of claim 20, wherein the central region extends as far as a third plane that is spaced apart from the first plane and the second plane.

\* \* \* \* \*

UNITED STATES PATENT AND TRADEMARK OFFICE
CERTIFICATE OF CORRECTION

PATENT NO. : 9,828,988 B2
APPLICATION NO. : 14/763236
DATED : November 28, 2017
INVENTOR(S) : Mario Koehler et al.

It is certified that error appears in the above-identified patent and that said Letters Patent is hereby corrected as shown below:

On the Title Page

(71) Applicant:
"Continental Automotive GmbH, Hannover (DE)..."---Change to---"... Continental Automotive GmbH, Hanover (DE)..."

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*